No. 11,705. Reissued Dec. 13, 1898.
R. H. LAYTON.
WAGON BRAKE.
(Application filed Feb. 27, 1897.)
2 Sheets—Sheet 1.
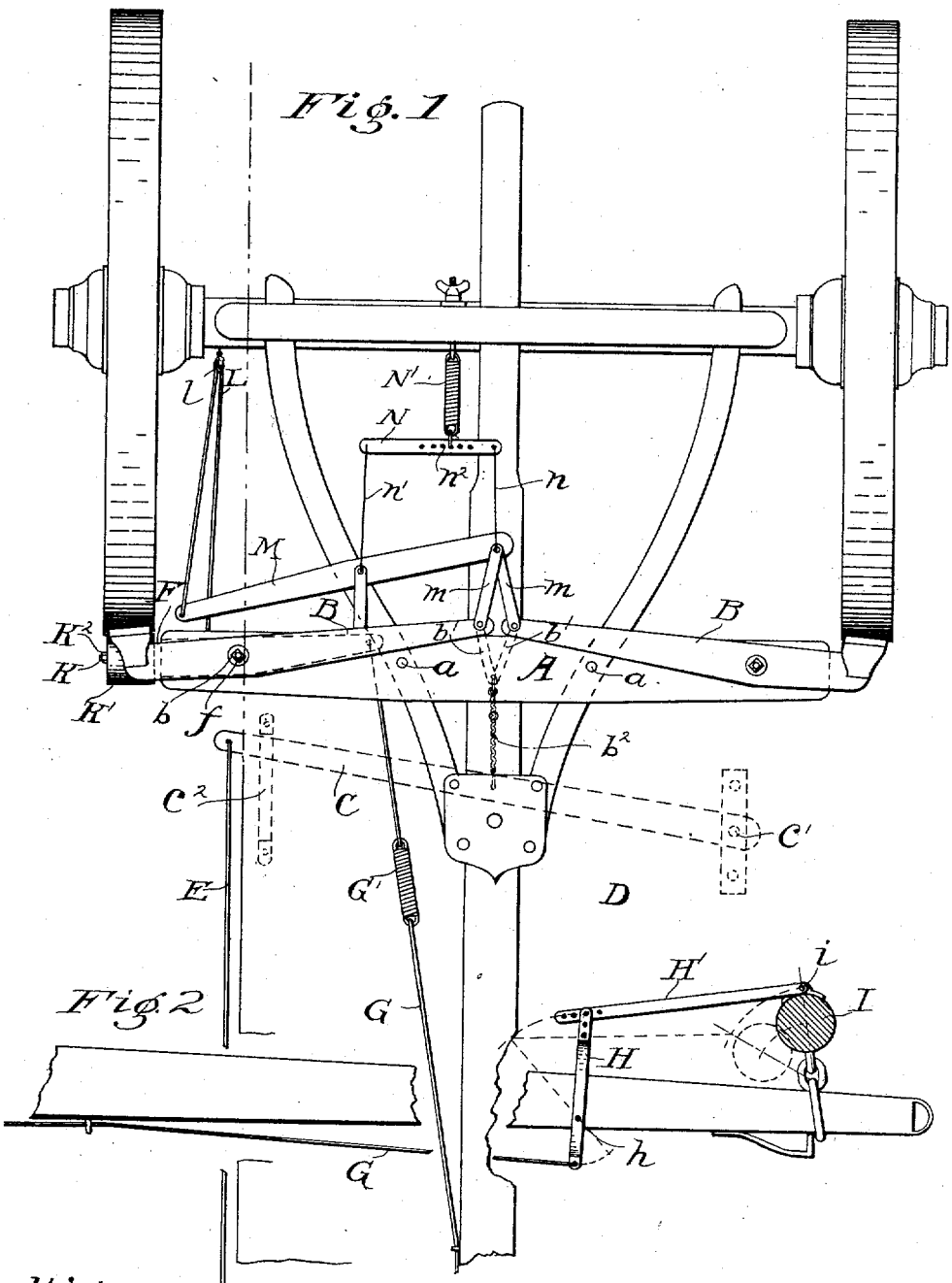
Witnesses
B. Kaufer
C. H. Gesler
By his Atty.
Inventor
Rawson H Layton
C. B. Reichel
THE NORRIS PETERS CO., PHOTO-LITHO., WASHINGTON, D. C.

No. 11,705. Reissued Dec. 13, 1898.
R. H. LAYTON.
WAGON BRAKE.
(Application filed Feb. 27, 1897.)
2 Sheets--Sheet 2.
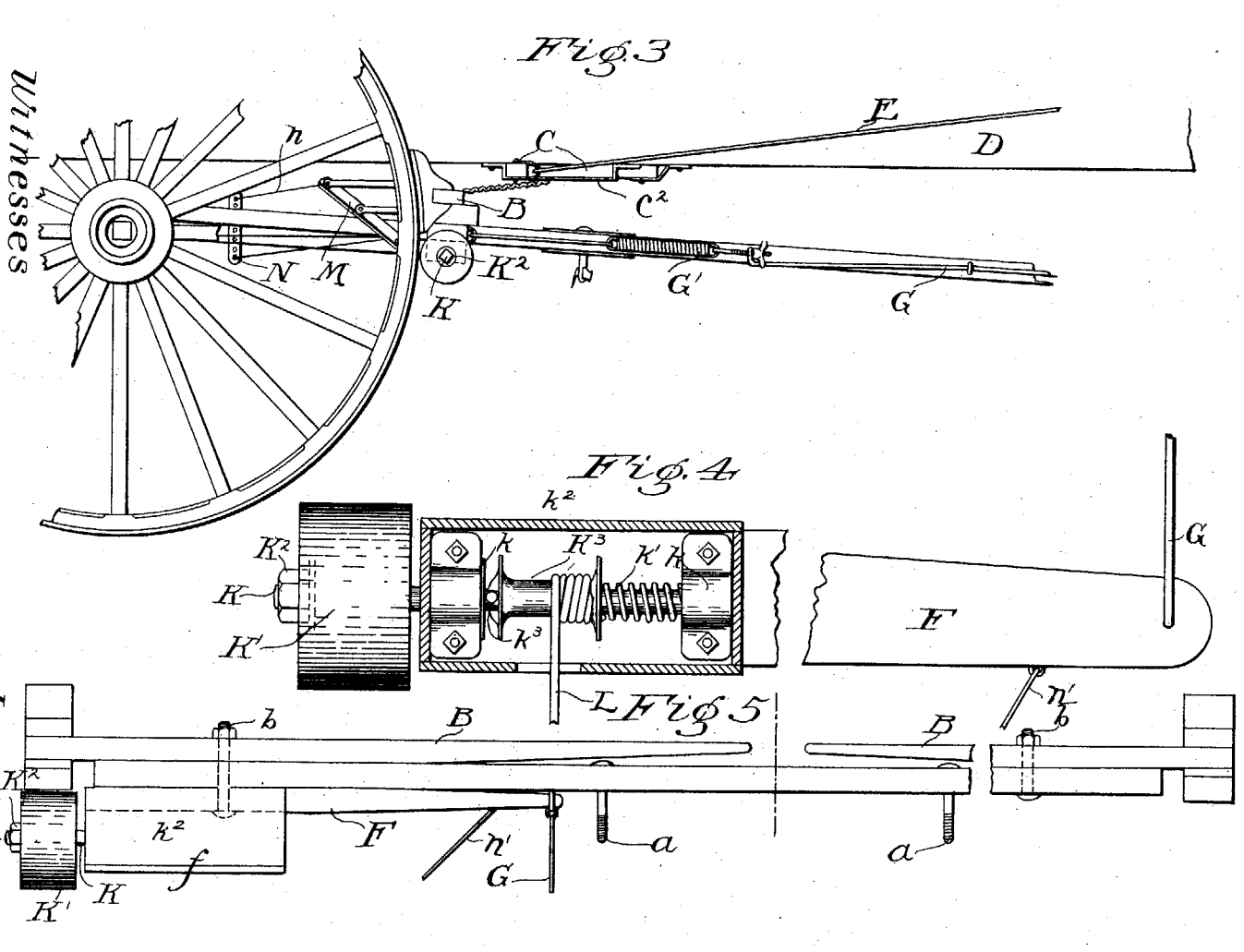
Witnesses
B. Kruspe
C. H. Zabel
By his Atty.
Inventor
Rawson H. Layton
O. B. Reichelt
THE NORRIS PETERS CO., PHOTO-LITHO., WASHINGTON, D. C.

UNITED STATES PATENT OFFICE.

RAWSON H. LAYTON, OF SOUTH BEND, INDIANA.

WAGON-BRAKE.

SPECIFICATION forming part of Reissued Letters Patent No. 11,705, dated December 13, 1898.

Original No. 574,809, dated January 5, 1897. Application for reissue filed February 27, 1897. Serial No. 625,400.

*To all whom it may concern:*

Be it known that I, RAWSON H. LAYTON, a citizen of the United States, residing at South Bend, in the county of St. Joseph and State of Indiana, have invented certain new and useful Improvements in Wagon-Brakes, of which the following is a specification.

My invention relates to a wagon-brake which may be operated either or both by manual power or by the horses pulling back upon the neck-yoke to provide an automatic brake or to provide a direct-acting brake adapted to be operated in any suitable or preferred manner.

The primary object of my invention is to provide a brake with an automatic lever which will first be operated to bring a roller thereon in contact with the wheel of the wagon, and thereby set the brake.

A further object of my invention is to provide an automatic brake which will respond quickly to the back action upon the neck-yoke and which may be operated either by hand or by foot power to give either additional brake action or independent brake action.

A further object of my invention is to provide an automatic brake which may be applied to the wheels without interfering with the movement of the wagon in backing, and also provide a simple combination-brake which will act effectively under all requirements on wagons of various kinds, as will hereinafter appear.

In the accompanying drawings, which illustrate my invention, Figure 1 is a plan view of the rear end and hind wheels of the running-gear of a wagon with my improved brake attached; Fig. 2, a side elevation of the forward end of the tongue with the neck-yoke in section and the brake connections applied thereto, the dot-lines representing the said yoke and brake connections in a second or operating position; Fig. 3, a side elevation of the parts shown in Fig. 1 with the rear wheel broken away; Fig. 4, an enlarged inverted view of the automatic brake-lever broken away in the middle and with the brake-roller gear-box in section; and Fig. 5, a front elevation of the cross-bar brake-levers and some of their connections, the said cross-bar and one of the brake-levers being broken away at one end.

The cross-bar A, carrying the several brake-levers, is securely bolted at $a$ to the rear hounds of a wagon as ordinarily constructed. The direct brake-levers B, which may be operated in the ordinary manner, are in this instance bolted at $b$ to the outer ends of the cross-bar A, and at their inner ends are connected by links $b'$ $b'$ and chain $b^2$ with a draw-lever C (shown by dot lines in Fig. 1 and by full lines in Fig. 3) and pivotally connected at one end $c'$ to the box or body D of the wagon, the other end of said lever being held within a guide-strap $c^2$ at the opposite side of the wagon-body and connected to a brake-rod E, which is operated by a hand or foot lever in any well-known or preferred manner.

An automatic brake-lever F is pivotally supported to the under side of the cross-bar A at $f$, and is connected to a rod G, which extends along the tongue to the forward end thereof and is there connected to the lower end of a lever H, pivoted at $h$ to the tongue and connected at its upper end by a bar H′ with a staple $i$ upon the upper side of a neck-yoke I, which latter is connected to the tongue in any preferred manner which will permit of its moving or rolling back upon the tongue, as shown by dot-lines in Fig. 2 of the drawings. A spring-tension link G′ is interposed at the rear end of rod G to admit of adjustment and relieve the rod of complete rigidity in action, and the upper end of the lever H is provided with a number of holes to allow the bar H′ to be adjusted thereon, and thus regulate the throw of the lever.

The outer end of the automatic brake-lever F is provided with bearings $k$ $k$, which support the shaft K of a brake-roller K′, which latter is securely held from turning upon the shaft by a thread and nut $K^2$ thereon, and a ratchet-spool $K^3$ upon the shaft K is connected at its inner end with a spiral spring $k'$ upon the said shaft K, the said spring being secured at its other end to the inner bearing $k$ of the brake-roller shaft.

A box $k^2$ covers the shaft K and its connection inside the brake-roller, and a chain L, secured to and wound upon the ratchet-spool $K^3$ by the action of the spring $k'$, passes through a slot in the box $k^2$ to a pulley $l$ upon the axle, and thence forward to an intermediate lever M, supported upon the cross-bar A and connected with the hand brake-levers, as hereinafter described, to give rotation to the ratchet-spool $K^3$, and thence by a pin $k^3$ on the shaft K to the brake-roller K′, which action of said roller being in a direction opposite to that of the forward movement of the wagon-wheel against which it bears, as shown in Fig. 3, will materially aid in arresting forward movement of the wheel. The ratchet-roller will, however, allow the free backward rotation of the said brake roller and wheel, as shown in Fig. 4, and not materially interfere with the backing of the wagon when the automatic brake is on, and when turned backward will allow the spool to unwind, and thus throw off the direct brake-levers.

The inner end of the intermediate lever M is connected by links *m m* with the inner ends of the two direct brake-levers B, and when they are thrown on the chain L is slackened and the ratchet-spool $K^3$ is turned back by the spiral spring $k'$ to rewind the chain upon the ratchet-spool in readiness for further operation.

The inner end of the intermediate lever M and the links *m m* are connected by a rod *n* and equalizing-lever N, adjustably secured by a spring-link N′ to the rear axle, and by a rod *n*′, at the opposite end of lever N, to the inner end of the automatic brake-lever F, by means of which the automatic and the direct or ordinary brake mechanism are connected.

When both brakes are thrown on, it will be seen that the spring-link N′ is under tension, and the lever N is connected by holes $n^2$ adjustably therewith to allow of sufficient movement of said equalizing-lever N and its connections with the automatic lever F to throw the latter, as well as the direct brake-levers, out of work whenever the automatic lever is relieved, as ordinarily, either by withdrawing the back pressure of the team, by the rotation of the wagon-wheel in a reverse direction against the brake-roller, as in backing, or by any other means which may be applied to the automatic lever and its connections for this purpose.

A brake thus constructed will meet all the requirements and is adapted to be applied to wagons of all kinds, whether a box-body is used or not. A simple cross-bar is all that need be used to connect the brake lever or levers to the running-gear, or they may be connected by other means. Any form of hand-brake may be used, as the draw-bar thereof may be easily connected by the lever and chain to the direct brake-lever; but a hand-brake need not be used, as the automatic brake is complete without it.

I claim as my invention and desire to secure by Letters Patent—

1. A combination hand and automatic brake comprising a cross-bar adapted to be secured to the running-gear of a wagon, direct brake-levers pivoted at each end thereof, a hand-lever mechanism connected to the inner ends of the direct brake-levers, an automatic brake-lever pivoted to said cross-bar and operated by the neck-yoke and an intermediate lever connecting the automatic and direct brake-levers, substantially as described.

2. In a wagon-brake the combination with the running-gear of a wagon of the brake-levers pivoted thereto, an intermediate lever connected to the inner ends thereof, an automatic brake-lever connected to the intermediate lever to set the brakes, and an equalizing-lever connected at one end to the automatic lever and at the other end to the direct brake-levers, substantially as described.

3. In a wagon-brake the combination with the running-gear of a wagon of the brake-levers pivoted thereto, an intermediate lever connected to the inner ends thereof, an automatic brake-lever connected to the intermediate lever to set the brakes, an equalizing-lever connected at one end to the automatic lever and at the other end to the direct brake-levers, and a tension-spring connecting the equalizing-lever and running-gear, substantially as described.

In testimony that I claim the foregoing as my invention I have signed my name in the presence of two subscribing witnesses.

RAWSON H. LAYTON.

Witnesses:
W. H. ROWE,
B. KRUEPER.